United States Patent
Reuss et al.

(10) Patent No.: US 8,402,939 B2
(45) Date of Patent: Mar. 26, 2013

(54) METHOD AND DEVICE FOR OPTIMIZING COMBUSTION OF DIESEL FUELS WITH DIFFERENT CETANE NUMBERS IN A DIESEL INTERNAL COMBUSTION ENGINE

(75) Inventors: Thomas Reuss, Neuenstadt (DE); Axel Macher, Neudenau (DE)

(73) Assignee: Audi AG, Ingolstadt (DE)

( * ) Notice: Subject to any disclaimer, the term of this patent is extended or adjusted under 35 U.S.C. 154(b) by 438 days.

(21) Appl. No.: 12/249,241

(22) Filed: Oct. 10, 2008

(65) Prior Publication Data

US 2009/0099754 A1 Apr. 16, 2009

(30) Foreign Application Priority Data

Oct. 10, 2007 (DE) .................... 10 2007 048 650

(51) Int. Cl.
*F02B 3/00* (2006.01)
*F02M 7/00* (2006.01)

(52) U.S. Cl. ........ 123/299; 123/305; 123/435; 701/103; 701/105; 701/111; 701/115; 73/114.16

(58) Field of Classification Search ............... 73/35.02, 73/114.16, 114.17, 114.53, 114.02, 114.18, 73/114.19, 114.21; 123/435, 299, 300, 305, 123/406.26; 701/102, 111, 114, 115, 105, 701/103
See application file for complete search history.

(56) References Cited

U.S. PATENT DOCUMENTS

| | | | | |
|---|---|---|---|---|
| 2,003,955 A * | 6/1935 | Reynolds | ......................... | 2/184 |
| 4,331,024 A * | 5/1982 | Childs et al. | ................ | 73/35.02 |
| 4,397,285 A * | 8/1983 | O'Neill | ........................ | 123/502 |
| 4,402,212 A * | 9/1983 | Childs | .......................... | 73/35.02 |
| 4,543,930 A * | 10/1985 | Baker | ............................. | 123/299 |
| 4,722,310 A * | 2/1988 | Igashira et al. | .............. | 123/300 |
| 5,050,556 A * | 9/1991 | Williams et al. | ......... | 123/406.28 |
| 5,457,985 A * | 10/1995 | Cellier et al. | ................ | 73/35.02 |
| 5,738,074 A * | 4/1998 | Nakamura et al. | ............ | 123/305 |
| 6,026,778 A * | 2/2000 | Mille et al. | ................. | 123/198 A |
| 6,125,690 A * | 10/2000 | Kitching | ...................... | 73/35.02 |
| 6,279,538 B1 * | 8/2001 | Herweg et al. | ............... | 123/435 |
| 6,609,413 B1 * | 8/2003 | De Craecker | ............... | 73/35.02 |
| 6,679,200 B2 * | 1/2004 | Dingle | .......................... | 123/1 A |
| 6,775,623 B2 * | 8/2004 | Ali et al. | ......................... | 702/31 |
| 6,805,099 B2 * | 10/2004 | Malaczynski et al. | ........ | 123/435 |
| 7,246,596 B2 * | 7/2007 | Yamaguchi et al. | .......... | 123/299 |
| 7,290,442 B2 * | 11/2007 | Zhu et al. | ................... | 73/114.67 |
| 7,322,341 B2 * | 1/2008 | Yamaguchi et al. | .......... | 123/435 |

(Continued)

FOREIGN PATENT DOCUMENTS

DE 19510592 C2 9/1995
DE 102004042010 A1 3/2006

(Continued)

*Primary Examiner* — Thomas Moulis
(74) *Attorney, Agent, or Firm* — Novak Druce Connolly Bove + Quigg LLP

(57) ABSTRACT

The invention relates to a method and a device for optimizing combustion of diesel fuels with different cetane numbers in a diesel internal combustion engine. It is provided that cylinder pressures are measured in at least one cylinder of the internal combustion engine during the combustion period, that at least one part of the measured cylinder pressures is evaluated in order to derive a characteristic value for the diesel fuel that is fed into the cylinder of the internal combustion engine, and that the characteristic value is used to change parameters that determine the combustion in the cylinders of the internal combustion engine.

13 Claims, 1 Drawing Sheet

U.S. PATENT DOCUMENTS

| | | | |
|---|---|---|---|
| 7,334,562 B2 * | 2/2008 | Jacobsson et al. | 123/299 |
| 7,401,591 B2 * | 7/2008 | Yamaguchi et al. | 123/299 |
| 7,480,557 B2 * | 1/2009 | Yamaguchi et al. | 701/104 |
| 7,556,030 B2 * | 7/2009 | Ashida et al. | 123/575 |
| 7,621,174 B2 * | 11/2009 | Takaku | 73/114.53 |
| 7,647,161 B2 * | 1/2010 | Haraguchi et al. | 701/103 |
| 7,669,583 B2 * | 3/2010 | Moriya | 123/406.22 |
| 7,673,618 B2 * | 3/2010 | Hasegawa et al. | 123/435 |
| 7,779,679 B2 * | 8/2010 | Wang et al. | 73/114.52 |
| 7,779,680 B2 * | 8/2010 | Sasaki et al. | 73/114.71 |
| 7,870,845 B2 * | 1/2011 | Sasaki et al. | 123/435 |
| 8,073,638 B2 * | 12/2011 | Birk et al. | 702/30 |
| 8,150,596 B2 * | 4/2012 | Kweon et al. | 701/103 |
| 2004/0144082 A1 * | 7/2004 | Mianzo et al. | 60/285 |
| 2004/0261414 A1 * | 12/2004 | Araki | 60/602 |
| 2007/0079647 A1 * | 4/2007 | Aoyama | 73/35.02 |
| 2007/0084435 A1 * | 4/2007 | Yamaguchi et al. | 123/299 |
| 2008/0010973 A1 * | 1/2008 | Gimbres | 60/276 |
| 2008/0053405 A1 * | 3/2008 | Vigild et al. | 123/406.26 |
| 2008/0308067 A1 * | 12/2008 | Schuckert et al. | 123/435 |
| 2009/0082940 A1 * | 3/2009 | Ishizuka et al. | 701/103 |
| 2009/0145199 A1 * | 6/2009 | Kuronita et al. | 73/35.02 |
| 2009/0158831 A1 * | 6/2009 | Cornwell et al. | 73/114.16 |
| 2009/0178388 A1 * | 7/2009 | Schumacher et al. | 60/276 |
| 2009/0183551 A1 * | 7/2009 | Fattic et al. | 73/23.31 |
| 2009/0223485 A1 * | 9/2009 | Hamedovic et al. | 123/435 |
| 2010/0030453 A1 * | 2/2010 | Takahashi et al. | 701/104 |
| 2010/0268444 A1 * | 10/2010 | Miyaura et al. | 701/105 |

FOREIGN PATENT DOCUMENTS

| | | |
|---|---|---|
| DE | 102005016809 A1 | 10/2006 |
| DE | 102006019317 A1 | 1/2007 |
| EP | 1775584 A2 | 4/2007 |
| JP | 2006016994 A | 1/2006 |

* cited by examiner

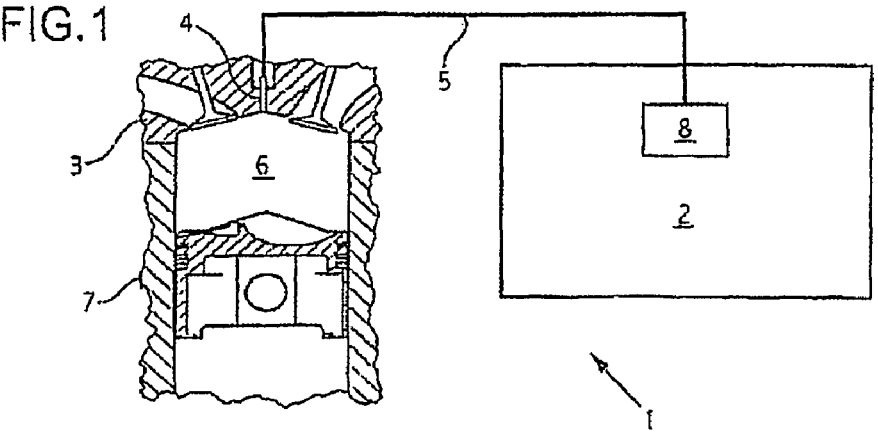
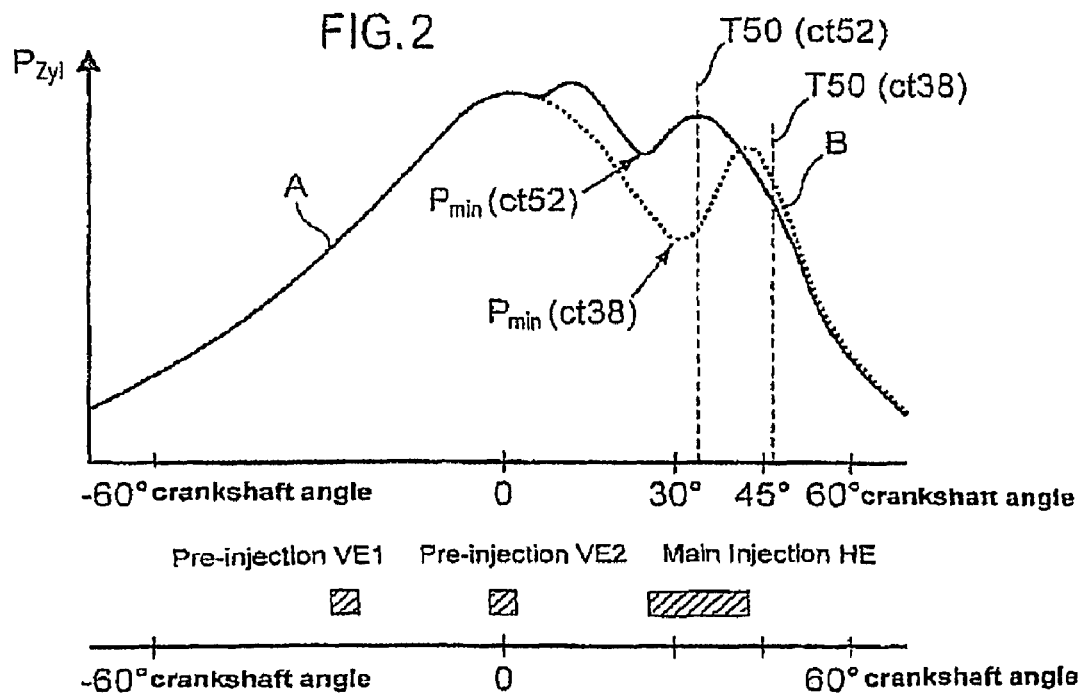

METHOD AND DEVICE FOR OPTIMIZING COMBUSTION OF DIESEL FUELS WITH DIFFERENT CETANE NUMBERS IN A DIESEL INTERNAL COMBUSTION ENGINE

The invention relates to a method and a device for optimizing combustion of diesel fuels with different cetane numbers in a diesel internal combustion engine.

BACKGROUND OF THE INVENTION

In the case of diesel internal combustion engines of today's motor vehicles, the course of the combustion (combustion process) in the cylinders of the internal combustion engine is adapted by a corresponding presetting of certain parameters that determine the combustion, such as, for example, time of one or more pre-injections, time of the main injection, amount of diesel fuel injected in the pre-injections or in the main injection, injection pressure, or rail pressure of a common rail fuel injection system, in such a way that the cetane number of the fuel that is used can be, for example, in a range of between 51 and 54 without the emissions of the internal combustion engine or the performance of the motor vehicle being adversely affected in any way in the case of a change in the cetane number within this range.

Based on more recent emission requirements, e.g., BIN 5, diesel fuels are increasingly being used, however, in which the cetane number is less than 50, with primarily in the U.S.A., diesel fuels with cetane numbers of below 40, up to 38, being used. For such a large fuel range comprising fuels with cetane numbers of between 54 and 38, however, none of the parameters determining the combustion, which allow for all of these fuels to achieve satisfactory results with respect to the emissions and the performance, can be found any longer.

Based on this, the object of the invention is to provide a method and a device of the above-mentioned type with which, in the event of a change in the cetane number of the fuel that is used, an adaptation that takes this change into account can be made to the combustion process in the cylinders of the internal combustion engine to avoid a deterioration of emissions or an impairment of the performance.

SUMMARY OF THE INVENTION

This object is achieved with respect to the method according to the invention in that cylinder pressures are measured in at least one cylinder of the internal combustion engine during the combustion period, in that at least one part of the measured cylinder pressure is evaluated in order to derive a characteristic value for the diesel fuel that is fed into the cylinder, and in that the characteristic value is used to change parameters that determine the combustion in the cylinders.

The device according to the invention comprises a means for measuring cylinder pressures in at least one cylinder of the internal combustion engine, means for evaluating a portion of the measured cylinder pressures and for deriving a characteristic value for the diesel fuel that is fed into the cylinder, as well as a means for changing parameters determining the combustion in the cylinders pertaining to a deviation of the characteristic value from a preset value.

The invention is based on the finding that a change in the combustion process in the cylinder, which can be detected in otherwise unchanged boundary conditions by an altered course of the cylinder pressure, is caused by a change in the cetane number of the diesel fuel that is used. In this case, with a decreasing cetane number of the fuel that is used, the point at which 50% of the diesel fuel that is fed into the cylinder has been reacted, and thus also the cylinder pressure associated with this point, is shifted to a later time, in particular because of the longer ignition delay. Conversely, there is a shift of this point with an increasing cetane number and thus also the related cylinder pressure because of the shorter ignition delay to earlier. The equivalent also applies to the cylinder pressures that are measured approximately after one-half of the combustion period.

Thus, when using a fuel with an unknown cetane number, a characteristic value can be derived from the cylinder pressure that is measured at a predetermined crankshaft angle or a pressure minimum that is measured in a predetermined crankshaft angle range by comparison with a reference value that is determined in advance for a fuel with a defined cetane number under the same boundary conditions at the same crankshaft angle or in the same crankshaft angle range and stored in a characteristic diagram, and said characteristic value is a measurement of the auto-ignition property of the unknown fuel and therefore call be referred to as a cetane number equivalent.

If the characteristic value that is derived from the measured cylinder pressures deviates from a reference value that is determined in advance for a fuel with a defined cetane number, then one or more parameters that influence or determine the combustion in the cylinders of the internal combustion engine are varied intentionally such that the cylinder pressure and thus, for example, also the combustion process in the cylinders correspond to that which is obtained under the same operating conditions when using fuel with the defined cetane number. In this way, the emissions of die internal combustion engine or the performance of the motor vehicle can be optimized independently of the cetane number of the fuel used in each case.

One way of measuring the cylinder pressures calls for the latter to be measured by means of a pressure sensor directly in one of the cylinders. Alternatively, however, the cylinder pressures can also be measured indirectly, for example by means of a sensor that measures a cylinder head deformation that is produced by the cylinder pressure.

The evaluation of the measured cylinder pressures and the derivation of the characteristic values from these cylinder pressures is advantageously performed using suitable software in the engine control device of the internal combustion engine, but it can also be performed in al additional control device.

Preferably, those cylinder pressures are evaluated that are measured after the combustion of about half the diesel fuel fed into the cylinder and/or, for example, after half the period of the combustion, since the course of the cylinder pressures via the crankshaft angle has the greatest differences when using fuels with different cetane numbers in this range.

According to a preferred embodiment of the invention, the characteristic value that is derived from the measured cylinder pressures is compared to a reference value that has been determined in advance for a diesel fuel with a defined cetane number, for example 52, under corresponding operating conditions and that has been stored in a characteristic diagram, for example in an engine control system storage device.

If necessary, that is, if the derived characteristic value deviates from the stored reference or comparison value ill the characteristic diagram for the same operating conditions, a correction value is formed from the characteristic value to change one or more of the parameters that are relevant to the combustion in the cylinders. These parameters can comprise, among other things, the amount of the fuel fed into the cylinder for one or more pre-injections, the time of the beginning of the pre-injection or the pre-injections, the interval between the pre-injections or between a pre-injection and the main injection, the value of the injection pressure or the rail pressure of a common-rail-injection device, the swirl of the injected fuel, the exhaust gas recycling rate, i.e., the amount of exhaust gas recycled in the cylinder, as well as the boost pressure of a turbocharger of the internal combustion engine.

The change of one or more of these parameters is carried out in a preset way, which depends on the characteristic values derived in each instance or the deviation thereof from the reference value, with, appropriately, correction values corresponding to each characteristic value or deviation being stored in an engine control system storage device. The correction values are selected in such a way that after the parameters are changed, the combustion process in the cylinders of the internal combustion engine corresponds to the combustion process when using diesel fuel with the defined cetane number, for example 52; thus, the emissions and the performance also correspond thereto when such a fuel is used.

Both the measurement of the cylinder pressures and their evaluation and the measurements then optionally taken can be performed in a special operational mode, which is advantageously activated after filling the motor vehicle with fuel, for example when the fuel level in the fuel tank rises by a preset minimum. It is also just as possible, however, to perform the measurement and the evaluation of the cylinder pressures continuously during the driving operation.

In addition to an optimum combustion process in the cylinders of the internal combustion engine, optimal parameters for the subsequent treatment of the exhaust gas can also be set with the measures according to the invention, for example for a particle filter or an NOx storage catalyst in the exhaust line of the internal combustion engine.

In addition, with the measures according to the invention, not only can a characteristic value for an unknown diesel fuel be determined, but also a corresponding characteristic value for a biodiesel fuel, such that by evaluating the cylinder pressures, the use of such a fuel can be inferred and thus the use of a rapeseed methyl ester (RME) sensor can be eliminated.

BRIEF DESCRIPTION OF THE DRAWING

The invention is explained in more detail based on an embodiment that is depicted in the drawing, in which:

FIG. 1 shows a diagrammatic view of a device according to the invention for optimizing combustion of diesel fuels with different cetane numbers in a diesel engine;

FIG. 2 shows a view of the plot of the cylinder pressure in a cylinder of the diesel engine when using diesel fuels with a cetane number of 52 or 38.

The device 1 that is depicted in FIG. 1 for optimizing combustion of diesel fuels with different cetane numbers in a diesel engine comprises the engine control device 2 of the diesel engine as well as a pressure sensor 4 that is installed on the cylinder head 3 of the diesel engine and that is connected to the engine control device 2 via a signal line 5.

The pressure sensor 4 is inserted into a hole in the cylinder head 3, such that during the operation of the diesel engine, it continuously measures the cylinder pressures $P_{Zyl}$ prevailing in the combustion chamber 6 of the cylinder 7, which then are sent to the engine control device 2 for evaluation via the signal line 5. As an alternative, however, a pressure sensor that is integrated in the cylinder head 3 and that measures the deformation of the cylinder head 3 that is caused by the changes in pressure in the cylinder 7 can also be used in order to calculate therefrom the plot of the cylinder pressure $P_{Zyl}$.

FIG. 2 shows the plot of the cylinder pressure $P_{Zyl}$ in cylinder 7 that is measured by pressure sensor 4 based on the crankshaft angle (KW) under defiled operating conditions in partial-load operation of the diesel engine, such as, for example, for two pre-injections VE2 and VE1 as well as a main injection HE, which together with their respective time period and the intervals between the injections are plotted below the pressure plot over the crankshaft angle.

While the pressure plot that is depicted as a solid line A in FIG. 2 is set in cylinder 7, when a diesel fuel with a cetane number of 52 is burned there, the dotted line B in FIG. 2 reflects the pressure plot in cylinder 7 in the case of a combustion of diesel fuel with a cetane number of 38.

As can be seen from FIG. 2, the pressure plot for a crankshaft angle of between −60 degrees of the crankshaft angle and 0 degree of the crankshaft angle is essentially identical for both fuels, but the pressure plot in the case of the fuel with a cetane number of 38 with crankshaft angles of between 0 degree of the crankshaft angle and approximately 45 degrees of the crankshaft angle deviates considerably from that of the fuel with the cetane number of 52 because of the longer ignition delay. Moreover, when using a fuel with a cetane number of 38, the CO and HC emissions are also higher.

In particular, FIG. 2 shows that, with a fuel with a cetane number of 52 (ct 52), the time T50, at which half of the fuel fed into the cylinder has been reacted, is approximately 35 degrees of the crankshaft angle, while with a fuel with a cetane number of 38, it is approximately 46 degrees of the crankshaft angle and thus is shifted later by more than 10 degrees of the crankshaft angle. Since the plot of the respective cylinder pressure $P_{Zyl}$ has a minimum pressure $P_{min}$ that is located between the upper dead center at 0 degree of the crankshaft angle and the respective lime T50, an important difference in cylinder pressure $P_{Zyl}$ is produced in a fuel with a cetane number of 38 in comparison to a fuel with a cetane number of 52 by the shifting of time T50 later at a crank angle of about 35 degrees of the crankshaft angle. In addition, the two pressure plots also have an important difference with respect to the absolute value of the minimum pressure $P_{min}$, since $P_{min}$ in a fuel with a cetane number of 38 is considerably lower in comparison to a fuel with a cetane number of 52.

Both differences can be used by evaluating the cylinder pressures $P_{Zyl}$ at 35 degrees of the crankshaft angle or in the range between 0 degree of the crankshaft angle and 45 degrees of the crankshaft angle in order to derive a characteristic value for the fuel burned in each case in cylinder 7 in the form of a cetane number equivalent from the cylinder pressure that is measured at 35 degrees of the crankshaft angle or from the value of the measured minimum pressure $P_{min}$ of between 0 degree of the crankshaft angle and 45 degrees of the crankshaft angle.

The derived cetane number equivalent is a value that corresponds roughly to the unknown cetane number of the currently used fuel, i.e., a characteristic value for the auto-ignition property of the fuel during injection in the compressed air in the combustion chamber 6, which is normally determined according to DIN 51773 [German Industrial Standard 51773] under standardized conditions in Germany for diesel fuels.

The evaluation of the measured cylinder pressures $P_{Zyl}$ is carried out in the depicted embodiment in the engine control device 2, which contains a suitable analysis circuit 8. This analysis circuit 8 compares, for example, the cylinder pressure $P_{Zyl}$ that is measured at a crank angle of 35 degrees of the crankshaft angle to a pressure that is used as a reference value, which has been measured in advance using a fuel with a defined cetane number, for example 52, in each case under the same operating conditions at a crank angle of 35 degrees of tie crankshaft angle, and then has been stored in corresponding characteristic diagrams for the various possible operating conditions of the engines and derives therefrom the cetane number equivalent of the fuel that is used. As an alternative, the minimum pressure $P_{min}$ can also be used for evaluating or for deriving the cetane number equivalent.

When, in the evaluation of the measured cylinder pressures $P_{Zyl}$ or the cetane number equivalents derived therefrom, it is determined that the cylinder pressure $P_{Zyl}$ measured by pressure sensor 4 deviates from the reference value stored for the same operating conditions or the derived cetane number equivalent deviates from the cetane number of the fuel that is used to determine the reference value, one or more parameters that determine the combustion in the cylinders 7 of the engine are varied intentionally by the engine control system 2, such as the amount of the fuel fed into the cylinder 7 in the case of the first or second pre-injection VE1 and VE2 or in the case of the main injection HE the time of the beginning of the first or second pre-injection VE1 and VE2, the interval between the end of the first pre-injection VE1 and the beginning of the second pre-injection VE2 or between the end of the second pre-injection VE2 and the beginning of the main injection HE, the value of the injection pressure or the rail pressure of a common-rail-injection device of the diesel engine or the recycled amount of exhaust gas, until the cylinder pressure $P_{Zyl}$ that is measured at a crank angle of 35 degrees of the crankshaft angle, the minimum pressure $P_{min}$ measured in the range between 0 degree of the crankshaft angle mid 45 degrees of the crankshaft angle, or the cetane number equivalent derived therefrom is identical to the reference value. This agreement then means that the combustion process in the cylinder 7 also corresponds approximately to the combustion process that is present when using fuel with the defined cetane number that is used to determine the reference value.

REFERENCE SYMBOL LIST

1 Device
2 Engine Control Device
3 Cylinder Head
4 Pressure Sensor
5 Signal Line
6 Combustion Chamber
7 Cylinder
8 Analysis Circuit
VE1 First Pre-Injection
VE2 Second Pre-Injection
HE Main Injection
KW Crankshaft Angle
$P_{Zyl}$ Cylinder Pressure
$P_{min}$ Minimum Pressure
T50 50% Reaction

The invention claimed is:

1. A method for optimizing combustion of diesel fuels with different cetane numbers in a diesel internal combustion engine, the method comprising:
measuring cylinder pressures in at least one cylinder of the internal combustion engine during the combustion period;
evaluating at least one part of the measured cylinder pressure;
deriving a characteristic value for the diesel fuel that is fed into the cylinder of the internal combustion engine;
comparing the measured cylinder pressures or the characteristic values derived therefrom to a reference value that has been determined for a diesel fuel with a defined cetane number under corresponding operating conditions and has been stored in a characteristic diagram; and
changing at least one of the parameters that determine the combustion in the cylinders of the internal combustion engine when the characteristic value deviates from the reference value,
wherein said parameters include:
the amount of fuel injected into the cylinder for a plurality of pre-injections;
the timing of the beginning of the pre-injections;
the interval between the pre-injections or between the pre-injections and the main injection.

2. The method according to claim 1, further comprising evaluating the cylinder pressures, which are measured after the combustion of about half the diesel fuel fed into the cylinder.

3. The method according to claim 1, further comprising evaluating the cylinder pressures, which are measured approximately after half the combustion period.

4. The method according claim 1, wherein the characteristic value is derived by comparison of a measured cylinder pressure and a reference value.

5. The method according to claim 4, wherein the characteristic value is derived by comparison of a cylinder pressure that is measured between 30 and 45 degrees of the crankshaft angle and a reference value.

6. The method according to claim 1, wherein the characteristic value is derived by comparison of a minimum pressure of the measured cylinder pressures and a reference value.

7. The method according to claim 6, wherein the characteristic value is derived by comparison of a minimum pressure of the measured cylinder pressures of between 0 and 45 degrees of the crankshaft angle and a reference value.

8. The method according to claim 1, wherein the derived characteristic value is a cetane number equivalent.

9. The method according to claim 1, wherein the cylinder pressures are measured directly by means of a pressure sensor.

10. The method according to claim 1, wherein the cylinder pressures are measured indirectly by means of a sensor that measures a cylinder head deformation that is produced by the cylinder pressure.

11. A device for optimizing combustion of diesel fuels with different cetane numbers in a diesel internal combustion engine of a motor vehicle, comprising
means for measuring cylinder pressures in at least one cylinder of the internal combustion engine during the combustion period;
means for evaluating at least one part of the measured cylinder pressures;
means for deriving a characteristic value for the diesel fuel that is fed into the cylinder of the internal combustion engine, and
means for changing at least one of the parameters that determine the combustion in the cylinders when the characteristic value deviates from a preset reference value,
wherein said parameters include the amount of fuel injected into the cylinder for a plurality of pre-injections, the timing of the beginning of the pre-injections, the interval between the pre-injections or between the pre-injections and the main injection.

12. A method of simulating the performance of a first diesel fuel of a selected cetane number in the combustion process of a diesel engine, in the use of a second diesel fuel of a cetane number lower than said selected cetane number comprising:

sensing a characteristic of the use of said second diesel fuel in said engine under certain fuel combustion process conditions;

comparing a value of said sensed characteristic with a stored value of the characteristics of the use of said first diesel fuel in said engine under similar fuel combustion process conditions; and changing at least one parameter of the operation of said engine affecting the fuel combustion process thereof when the sensed characteristic deviates from the stored value, wherein said parameters include the amount of fuel injected into the cylinder for a plurality of pre-injections, the timing of the beginning of the pre-injections, the interval between the pre-injections or between the pre-injections and the main injection.

13. The method according to claim 12 wherein said characteristic comprises the cylinder pressure of said engine at a selected time of said fuel combustion process.

* * * * *